Dec. 6, 1949  J. L. SCHUELER  2,490,382
MELTING FURNACE
Filed Dec. 31, 1945  4 Sheets-Sheet 1

INVENTOR.
Julian L. Schueler

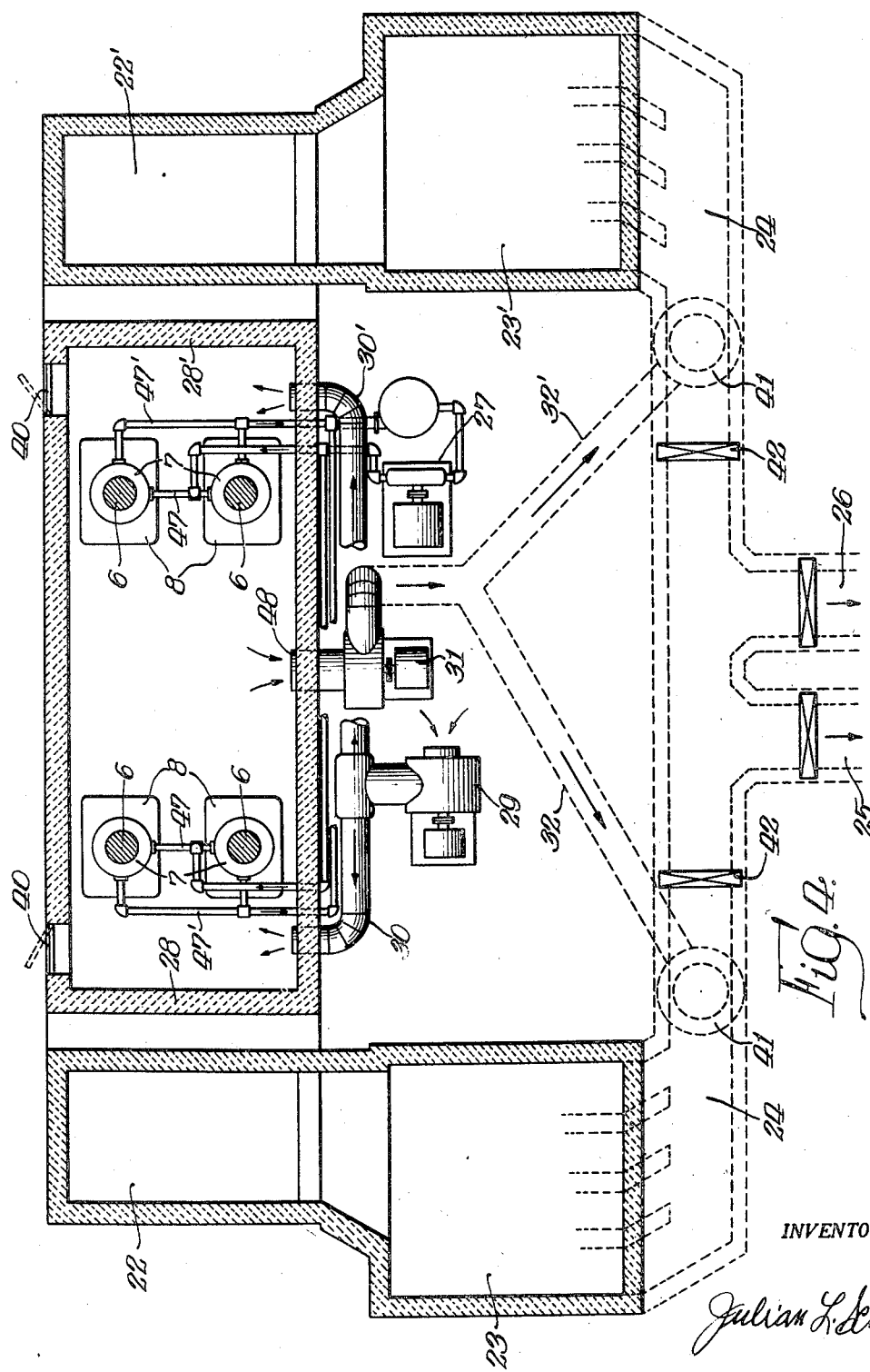

Patented Dec. 6, 1949

2,490,382

UNITED STATES PATENT OFFICE 2,490,382

MELTING FURNACE

Julian L. Schueler, Kokomo, Ind.

Application December 31, 1945, Serial No. 638,535

5 Claims. (Cl. 263—40)

My invention relates to an improved furnace for melting materials, and more specifically relates to open hearth and electric steel melting furnaces requiring repeated additions of scrap to make up one batch, or, "heat," of steel although it will be readily apparent from the description which follows, that the invention may be applied to other ferrous, non-ferrous or non-metallic material melting furnaces.

A principal object of my invention is to provide a bottom for a melting furnace wherein said bottom may be selectively positioned.

One object of my invention is to reduce the time for charging material to be melted in such furnaces.

Still another object is to conserve furnace heat.

A further object is to maintain a more uniform furnace atmosphere during the melting operation.

A further object is to provide conditions for improved combustion in the furnace during the melting down period.

Another object is to provide better protection for the roof and walls of the furnace against burning.

A still further object is to provide means for keeping the material to be melted constantly in position at the most efficient melting zone of said furnace.

Other objects and purposes of the invention will appear hereinafter wherein, for the purpose of clarity, I have confined my description to an open hearth steel melting furnace. Although I have so limited my description it will be obvious that materials other than steel, such, for example, as glass, or non-ferrous metals may be charged and melted in a similar manner.

It will also be obvious, that while I show an oil fired furnace, my invention will be equally well operative when the melting heat is supplied by gas, electricity, or combinations of melting means.

As a suggested embodiment of my invention, I have shown in the accompanying drawings an open hearth steel melting furnace, wherein Figure 1 illustrates a cut-away section of a front view of an open hearth furnace, showing a section through the center of the hearth;

Figure 4 is a plan view of the furnace taken on the line 4—4, Figure 1, showing the arrangement of the hydraulic jacks used for moving the furnace bottom up and down to the positions shown in Figures 2 and 3 and positions intermediate thereof, and showing also the arrangement of the forced draft and cooling system.

Figure 1:
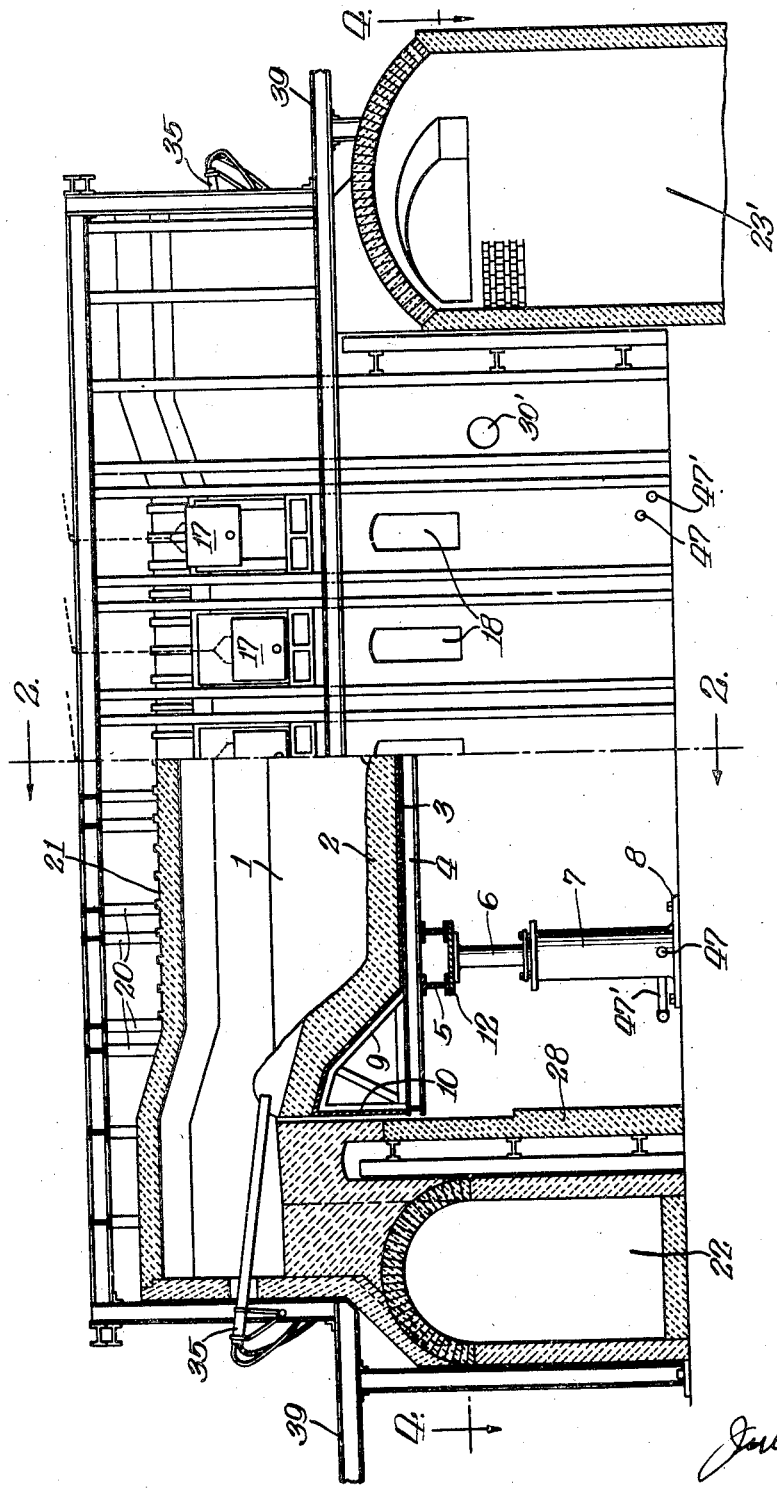

In present types of open hearth steel melting furnaces the furnace bottom is fixed in a rigid and immovable position with respect to the furnace structure per se, the distance from the furnace bottom to the furnace roof remaining the same for each individual furnace, although this distance may vary between different furnaces.

In my furnace, the furnace bottom may be moved up and down, the relative position of the walls of said furnace remaining fixed, with respect thereto, although as the bottom is moved its distance from the roof varies.

When my furnace is ready to charge the bottom is moved to its top or upper position by the furnace operator, preferably the first helper, who operates the elevator mechanism. The material to be melted is charged on the bottom, to a level with the fore plate of said furnace. By this means the charging box always enters the furnace level, as it is not necessary to maneuver the box into position in order to get the material into the furnace. The furnace bottom is then lowered, another part of the charge is added, and the lowering and charging repeated until the entire charge has been added to the furnace. It is not necessary, of course, that the charge be added exactly in this same manner, if some special condition dictates otherwise.

The furnace bottom is now at, or near, its lowest position, and the material to be melted, together with any fluxes necessary, such, for example, as limestone, or lime, has been charged. For the purpose of this description it will be assumed that the charge is principally ferrous scrap. The furnace doors are then closed and the melting begins, the doors remaining closed during the scrap melting operation. Some furnaces may be charged through the top instead of through doors, but in either event the principle is the same. As the scrap melts from the top down, the bottom is gradually raised so that the unmelted portion of the scrap is gradually moved into the melting zone, the object being to always keep the scrap suitably positioned for the best combustion and melting conditions, until finally the bottom is again at its highest position, and the refining then proceeds in the usual manner.

When using the fixed bottom furnace the procedure is to add the scrap until the furnace is as full as possible, the scrap ofttimes being charged very close to the furnace roof. This charge of scrap is melted down to a point where more scrap can be added. The furnace doors are then raised, the heat turned off and more scrap added. This process is repeated until all of the scrap has been added, this charging process taking several hours, depending on the amount of scrap used.

It is also obvious that the furnace cools off during these scrap additions on account of the necessity for opening the furnace doors, and shutting off the heat during the repeated charging operations, with a consequent loss of heat, the oxidation of the metal due to the added influx of air, and damage to the brick work of the furnace due to the temperature changes.

Furthermore, the position of the scrap in the furnace is not controllable and the combustion zone constantly varies. This causes rapid deterioration of the furnace roof and walls due to impingement of the flame thereon as deflected from the heterogeneous mass of scrap.

Furthermore, due to the height of the scrap in the furnace, it is necessary for the charging machine operator to maneuver the charging boxes to get the scrap into the furnace, and many times the front and back walls of the furnace are damaged by this maneuvering as well as the charging machine itself.

With my improved furnace all of these disadvantages are obviated.

Referring now to the drawings, in which like reference numerals denote corresponding parts throughout the several views, the numeral 1, refers to the entire furnace bottom made up of refractory material 2, built up on steel plates 3, forming the bottom pan, and supported on eye beams 4, which in turn rest on the structural steel members 5, resting on slabs 12, which, in turn, are attached to the top of the pistons 6, of hydraulic lifts 7, the latter, in turn, resting on, and attached to, foundations 8. The pan 3 is supported at its sides and ends by structural steel members 9, and heavy steel slabs 10, in order to impart rigidity to said pan. Front wall 11, of said furnace extends to the same base level as that of the hydraulic lifts 7; and back wall 13, of said furnace extends to the same base level.

In the back wall 13 is the removable door or panel 14. In the bottom 1 is tap hole 15. Said tap hole is plugged in the usual manner by refractory 16.

In the front wall 11 are doors 17, and removable panels 18, similar panels (not shown) being placed also in back wall 13. Resting on skew back channels 19, attached to supporting columns, or buck stays 20, is the room 21.

At either end of the said furnace are slag pockets 22 and 22', opening into checker chambers 23 and 23' and thence into flues 24 to the stack 25 or waste heat boiler 26. The slag pockets, checker chambers and associated flues may be of any suitable design.

Supporting the furnace bottom 1, are the hydraulic jacks or lifts, 7, four being shown. These lifts are operated by means of a conventional type pressure pump unit 27.

Since the entire lower part of the furnace bottom 1 is entirely enclosed by the walls 11 and 13 and end walls 28 and 28' it is desirable to cool these walls by means of forced air draft. This is accomplished by means of motor driven fan 29 through ducts 30 and 30' opening into said area. The hot air from said area is exhausted by motor driven suction fan 31 through exhaust duct 48, and discharged into the checker chambers 23 and 23' through ducts 32 and 32'. Entrance to said area may be made through suitable doors 49.

Figure 2:
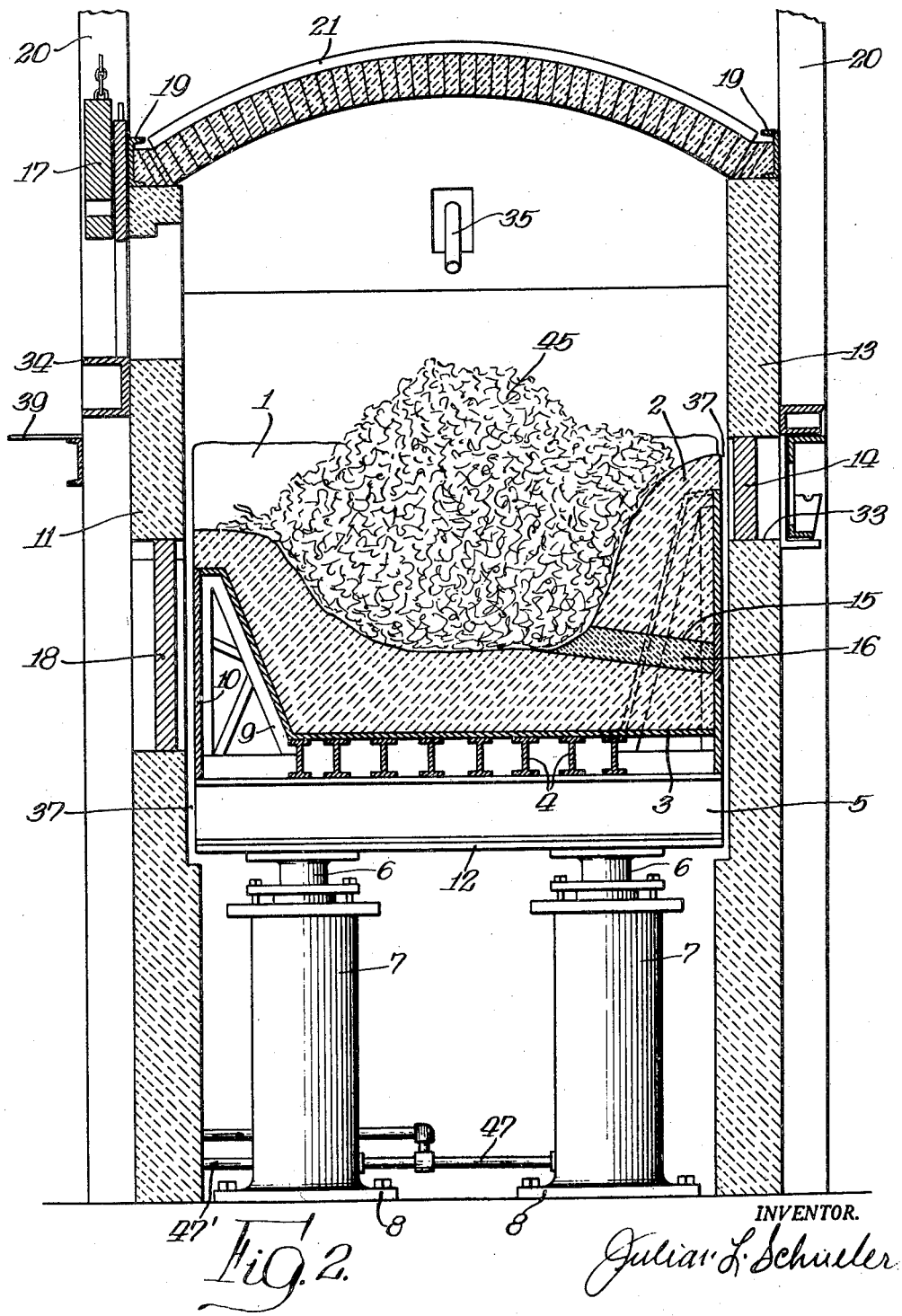
Figure 2 is a section taken on the line 2–2 of Figure 1, showing the furnace bottom in its lowermost position.

It will now be assumed that the furnace is ready to charge. The bottom 1, will be placed in the position shown in Figure 3, which is the top or upper position of said bottom, this being accomplished by moving said bottom into position by means of the hydraulic lifts 7 acting on pistons 6 thereof. The tap hole 15 is plugged with refractory 16 in the usual manner, and wall plug 14 is placed in wall 13 to close the opening 33 thereof, as shown in Fig. 2.

Scrap 45 in charging boxes not shown, is then placed in the bottom 1 of the said furnace, through the opening of the doors 17, by a charging machine, also not shown, until said scrap is substantially level with fore plate 34. Then the bottom is lowered by means of hydraulic jacks 7 to a new position, and more scrap and fluxing material added, this procedure being repeated for the scrap additions until the bottom is in its lowest position as shown in Figure 2.

The doors 17 are then closed, the burners 35 ignited, and the melting proceeds as in the usual manner for open hearth steel melting furnaces, except that as the top of the scrap melts, the bottom 1, is gradually raised, always keeping the top of the scrap in an advantageous melting position with reference to the burners 35, the furnace being reversed in the usual manner by means of reversing valves 41 and 42. The furnace bottom finally reaches the top position as shown in Figure 3, the molten steel 43, being positioned substantially as shown, with slag 44 floating on top of said steel.

Figure 3:
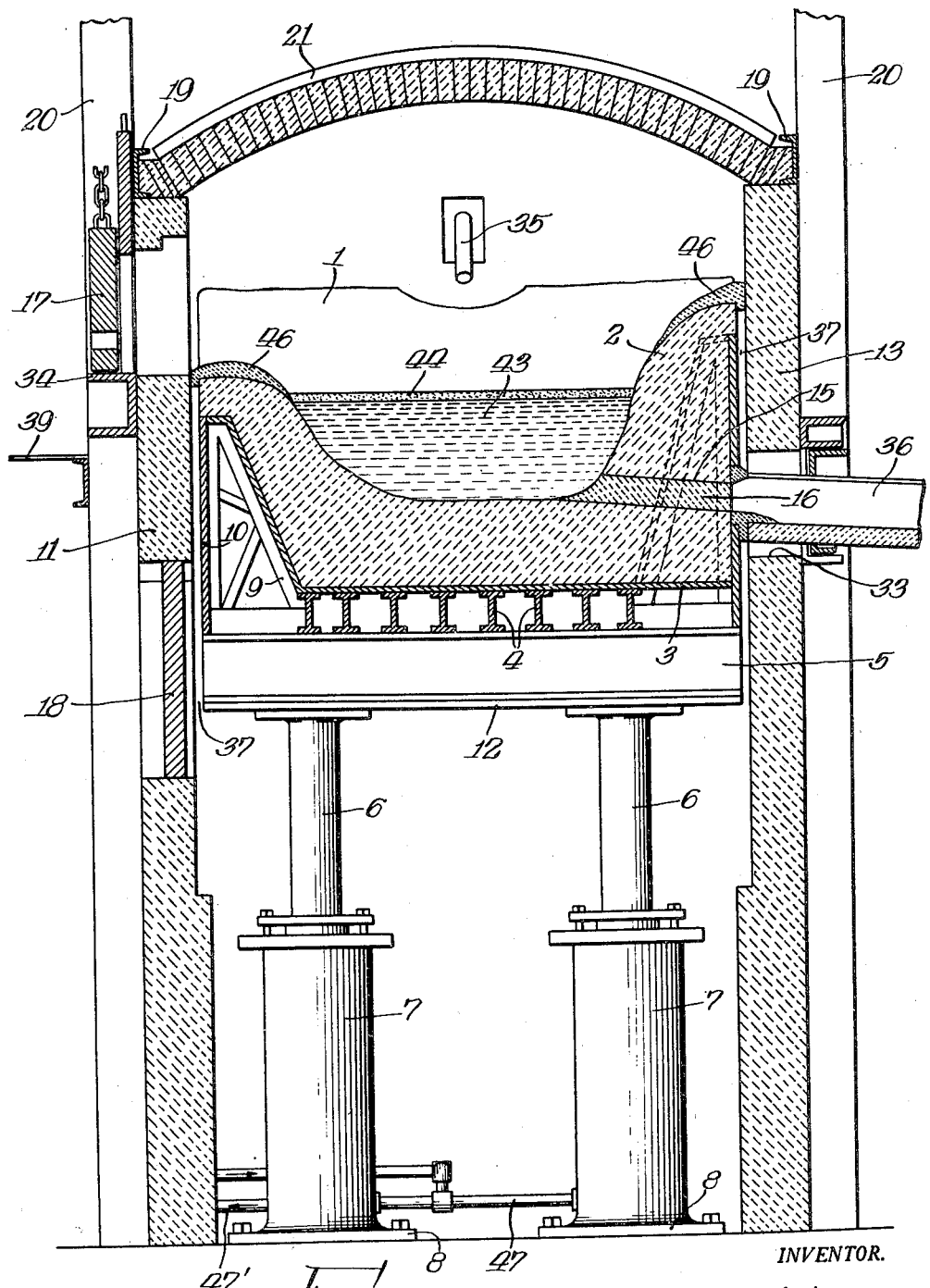
Figure 3 is a similar section as that shown in Figure 2, but with the furnace bottom shown in its uppermost position.

When the furnace bottom reaches its upper position, the banks are made up in the usual manner, thus closing the small opening 37, said closure being illustrated at 46 in Figure 3. At the same time, the panel 14 is removed, the spout 36 placed in position, and the refining and subsequent tapping of the metal takes place in the usual manner.

When the metal has been tapped from the furnace, the furnace bottom is in the position shown in Figure 3, so that in order to prepare for the next heat of steel, the bottom material 2 is made up in the usual manner, spout 36 removed, tap hole plug 16 inserted in tap hole 15, and panel 14 placed in position as shown in Figure 2. The furnace is again ready to charge.

During the charging operation, very small pieces of scrap may get into opening 37, and either drop through, or be pushed up as the bottom is raised. If necessary these pieces can be removed by taking out panels 18 and removing the material therethrough. Also, during this period, some of the air from fan 29 flows up through the opening 37 and this is desirable for cooling purposes during the scrap melting operation. The cooling air from fan 29, not only cools the furnace bottom 1, but also keeps the hydraulic jacks 7, cool, as well as the walls below said bottom. The pressure of air from fan 29 is preferably kept just above the pressure within the melting zone of the furnace.

The bulk of the melting being carried out on the furnace bottom 1, per se, the walls 11 and 13, below the fore plate 34 and floor 39, are not subjected to extreme heat. The breasts and ends of the bottom 1, are preferably built higher than is usual with furnaces of this type although this is not absolutely necessary.

The elevators 7, as shown, are hydraulic. The hydraulic fluid is transmitted to said elevators or jacks through supply lines 47, the return lines being shown at 47'; the direction of flow indicated by the arrows in Figure 4. It is obvious that any suitable electrical or mechanical raising and lowering means may be employed if desired. 41 and 42 are reversing valves of the ordinary open hearth furnace type.

If desirable, a closure not shown, may be built just below the level of the lowest point reached by the furnace bottom, and the jacks 7, may be set below this point. In this event, the walls 11, 13, 28 and 28' need not be solid below said closure, and the cooling air from fan 29 will enter above the said closure.

It is obvious, also, that in order to charge said furnace it may be placed at its lowered, or any intermediate position, at the beginning of the charging operation, instead of in the manner described herein.

While this specification discloses only one form of melting furnace in which my invention is embodied, it is thus limited for purposes of illustration and clarity only, and may be modified and embodied in other forms without departing from the spirit of my invention.

What I claim is:

1. In a material melting furnace forming an enclosure made up of roof, side walls, end walls, combustion chamber, bottom, and an enclosed area below said bottom, elevator means associated with said furnace having said bottom mounted thereon, said bottom being disposed within said enclosure and spaced therefrom, and adapted to be incrementally moved up and down within said structure by said elevator means, means forming a part of said furnace to permit charging thereof, means to permit egress of molten material therefrom, heat producing means associated with said furnace, air cooling means adapted to cool said bottom and prevent the passage of combustion products from said combustion chamber into said enclosed area below said bottom, and means for sealing off said combustion chamber from said area when said bottom is in suitable position.

2. In an open hearth steel making furnace, a bottom adapted for selective positioning therewithin, a positioning means for said bottom comprising an elevator for positioning said bottom during the charging and melting operations in said furnace, said bottom being disposed within the walls of said furnace and spaced therefrom, heating means associated with said furnace, means for permitting of charging of said furnace, means for permitting egress of molten metal of said furnace, means for preventing the products of combustion from entering the spaced area below said bottom, and means for closing said space between said bottom and said furnace walls.

3. In an open hearth steel making furnace including a bottom for said furnace, a positioning means for said bottom, comprising an elevator having said bottom mounted thereon for selectively positioning said bottom during the charging and melting operations, said bottom being positioned within the walls of said furnace and spaced therefrom to permit said movement, air cooling means for said bottom and said elevator adapted to permit said air to pass between said bottom and said furnace walls to prevent the passage of products of combustion from said furnace to the area below said bottom.

4. In an open hearth steel making furnace having a bottom adapted to be selectively positioned within said furnace enclosure and spaced therefrom, a charge on said bottom comprising substantially metallic materials, elevator means associated with said bottom adapted to position said bottom so that said charge may be kept constantly in the most efficient melting zone of said melting means during the progress of the melting operation and means for cooling said elevator and said bottom, said cooling means adapted to prevent the entrance of products of combustion into the area below said bottom until said bottom is sealed off, and means for permitting the egress of the molten material from said furnace when said melting operation is completed.

5. In a material melting furnace forming an enclosure made up of roof, side walls, end walls, combustion chamber and bottom, an enclosed area below said bottom, and elevator means, said bottom being disposed within said enclosure and spaced therefrom and adapted to be incrementally moved up and down within said structure by said elevator means, air cooling means for said bottom adapted to prevent the entrance of products of combustion from said furnace to said enclosed area below said bottom, means associated with said furnace for permitting the charging thereof as said bottom is movably placed in suitable position to receive said charge, melting said charge as said charge is incrementally positioned in the most efficient melting zone of said furnace, sealing off said spaced area between said bottom and said furnace structure, and discharging the molten material from said furnace.

JULIAN L. SCHUELER.

REFERENCES CITED

The following references are of record in the file of this patent:

UNITED STATES PATENTS

| Number | Name | Date |
|---|---|---|
| 283,342 | Henderson | Aug. 14, 1883 |
| 287,864 | Ryder | Nov. 6, 1883 |
| 490,451 | Nau | Jan. 24, 1893 |
| 803,147 | Appleby | Oct. 31, 1905 |
| 1,354,286 | De Bats | Sept. 28, 1920 |
| 1,374,802 | Appleby | Apr. 12, 1921 |
| 2,365,183 | Forsberg | Dec. 19, 1944 |

OTHER REFERENCES

Pages 272 and 273, Ferrous Production Metallurgy; Bray, 1942.